Figure 1:
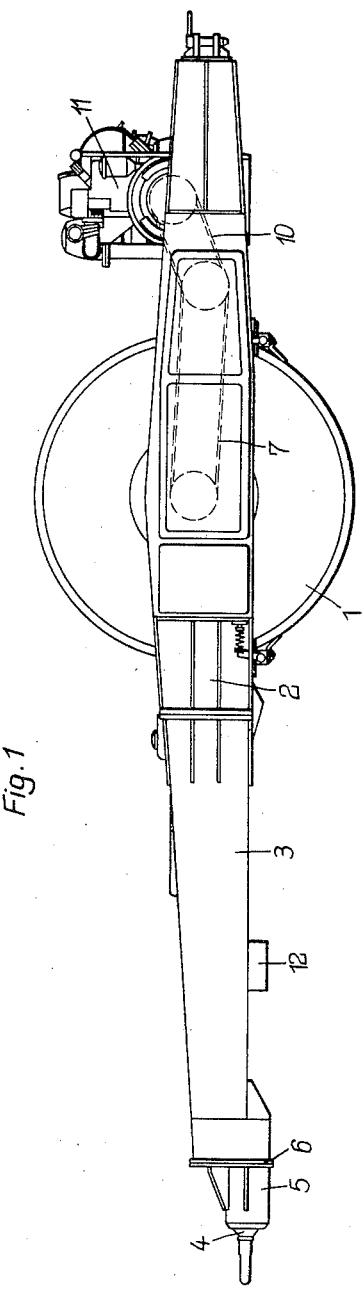

Dec. 25, 1962    H. L. KÄMMERLIN    3,069,984
VIBRATORY ROAD ROLLERS
Filed Dec. 22, 1958    2 Sheets-Sheet 1

Inventor:
HEINRICH L. KÄMMERLIN

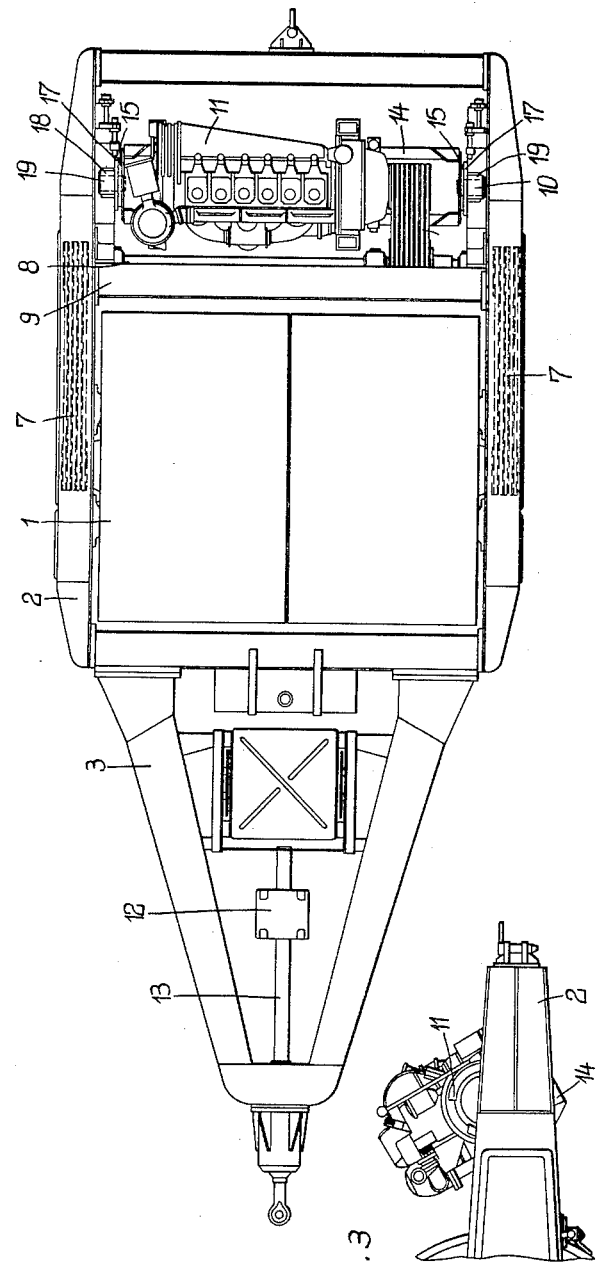

United States Patent Office 3,069,984
Patented Dec. 25, 1962

3,069,984
VIBRATORY ROAD ROLLERS
Heinrich L. Kämmerlin, Hameln (Weser), Germany, assignor to Firma ABG-Werke Gesellschaft mit beschränkter Haftung, Hameln (Weser), Germany
Filed Dec. 22, 1958, Ser. No. 782,182
Claims priority, application Germany Apr. 26, 1958
1 Claim. (Cl. 94—50)

This invention relates to vibratory road rollers which, as is known, compact the road surface whilst travelling forward at a very low speed. Whenever such rollers are employed on an incline it is a disadvantage that the driving motors have to operate in an inclined position which results in unfavourable working conditions for the motors and in increased wear of their moving parts. These effects are the more pronounced the longer work has to continue in such inclined position and the greater the angle of inclination of the motors.

It is an object of the invention to eliminate this disadvantage and according to the invention, in a vibratory road roller, a motor is provided to produce vibrations of a roller drum or to drive the roller, or both, the motor being pivotally mounted on the roller frame to permit fixing the motor in any desired angular position.

The motor pivoting arrangement is such that the motor can be pivoted in a position best suited for its operation even when inclined surfaces are being rolled and the pivoting axis of the motor passes preferably through the centre of the crankshaft or of the driving unit.

In one construction of roller embodying the invention the motor is mounted on a base plate which can pivot about pins on the roller frame and be fixed in any desired position.

In the case of trailer or towed rollers, in which the roller body is mounted in the centre of an oblong roller frame carrying the driving motor in its rear portion, a movable counter weight is, according to a further feature of the invention, provided between the trailer or towing drawbar and the roller drum to compensate for alterations in the weight so that the drawbar can be raised and lowered more easily.

One form of motor mounting for a vibratory roller embodying the invention will now be more fully described by way of example with reference to the accompanying drawings in which:

FIG. 1 is a side view of such a vibratory trailer roller,
FIG. 2 is a plan view of the roller, and
FIG. 3 is a fragmentary side view showing the engine in an inclined position relative to the roller frame.

Referring to the drawings, the trailer roller shown has a vibrating roller body 1 mounted in a frame 2 to which is connected a drawbar 3 with a flexible trailer coupling 4. The centre line of the coupling housing 5 is arranged eccentrically with respect to its attachment flange 6 so that the height of the coupling can be varied by rotating the said flange through 180°.

The vibratory drive of the roller body is transmitted by V belts 7 arranged on either side, the belts being driven by an intermediate shaft 8 mounted on a cross member 9 which in turn is driven by a motor 11 through V belts 10. The overall arrangement is such that the V belt drives 7 and 10 can have their tension adjusted independently of each other. Any changes of load due to such adjustment are balanced by sliding a counter weight 12 provided on the drawbar 3, the counter weight being mounted to slide along and be fixed in position on a carrying bar 13. The driving motor 11 itself is mounted inside a base frame 14 provided at the sides with flanges 15 opposite which flanges 17 are mounted on bearing blocks 18 in the roller frame. Pivots 19 passing through the flanges 17 enable the motor 11 to be swivelled with respect to the roller frame, and the flanges 15 and 17, which can be bolted together, allow the inclined position of the motor to be maintained. Preferably the axis about which the motor is arranged to pivot passes through the centre of the motor crankshaft or it may pass through the driving unit.

What I claim is:

A vibratory road roller comprising a frame, a roller drum rotatably supported in the frame, a motor mounted in the frame and connected to vibrate the drum, said motor being mounted in the frame at the rear end thereof, a draw bar secured to the front end of the frame, a carrying bar mounted in the draw bar in the longitudinal center axis of the draw bar and frame, a counterweight slidably mounted on the carrying bar for adjustment on the latter to vary the position of the counterweight, a base frame secured in the first-mentioned frame at the rear end thereof in which the motor is mounted, and means to adjust the motor to incline the latter relative to the vertical.

References Cited in the file of this patent
UNITED STATES PATENTS

| | | |
|---|---|---|
| 1,442,235 | Ricker | Jan. 16, 1923 |
| 1,445,604 | Schroeder | Feb. 13, 1923 |
| 1,894,408 | MacKenzie | Jan. 17, 1933 |
| 2,276,713 | Bramble | Mar. 17, 1942 |
| 2,440,585 | Hutchinson | Apr. 27, 1948 |
| 2,466,822 | Pollitz | Apr. 12, 1949 |
| 2,549,182 | Ekenstam | Apr. 17, 1951 |
| 2,572,109 | Coates | Oct. 23, 1951 |
| 2,756,065 | Schick | July 24, 1956 |
| 2,868,094 | Andersson | Jan. 13, 1959 |

FOREIGN PATENTS

| | | |
|---|---|---|
| 652,958 | Great Britain | May 2, 1951 |